(12) United States Patent
Akama (10) Patent No.: US 10,005,188 B2
(45) Date of Patent: Jun. 26, 2018

(54) PARALLEL LINK ROBOT, HAND FOR PARALLEL LINK ROBOT, AND PARALLEL LINK ROBOT SYSTEM

(71) Applicant: KABUSHIKI KAISHA YASKAWA DENKI, Kitakyushu-shi (JP)

(72) Inventor: Toru Akama, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 395 days.

(21) Appl. No.: 14/601,233

(22) Filed: Jan. 21, 2015

(65) Prior Publication Data
US 2015/0209964 A1 Jul. 30, 2015

(30) Foreign Application Priority Data

Jan. 24, 2014 (JP) .................................. 2014-011707

(51) Int. Cl.
*B25J 15/06* (2006.01)
*B25J 9/00* (2006.01)
*B65G 47/91* (2006.01)

(52) U.S. Cl.
CPC ......... *B25J 15/0616* (2013.01); *B25J 9/0051* (2013.01); *B25J 9/0093* (2013.01); *B65G 47/915* (2013.01); *B65G 47/918* (2013.01)

(58) Field of Classification Search
CPC .... B25J 15/0616; B25J 9/0051; B25J 9/0093; B65G 47/918; B65G 47/915
See application file for complete search history.

(56) References Cited

U.S. PATENT DOCUMENTS

| 6,255,751 B1 * | 7/2001 | Hoffmann | H02K 7/083 310/40 MM |
| 8,413,539 B2 * | 4/2013 | Chenu | B25J 17/0266 414/735 |
| 2006/0082172 A1 * | 4/2006 | Clark | B25J 15/0616 414/752.1 |
| 2010/0206120 A1 | 8/2010 | Kinoshita et al. | |
| 2012/0060637 A1 | 3/2012 | Kinoshita et al. | |
| 2012/0213623 A1 | 8/2012 | Hariki et al. | |
| 2013/0108409 A1 * | 5/2013 | Wu | B25J 15/0616 414/800 |

(Continued)

FOREIGN PATENT DOCUMENTS

| CN | 101804631 | 8/2010 |
| CN | 102642211 | 8/2012 |

(Continued)

OTHER PUBLICATIONS

Japanese Office Action for corresponding JP Application No. 2014-011707, dated Jan. 19, 2016 (w/English machine translation).

(Continued)

*Primary Examiner* — Michael S Lowe
(74) *Attorney, Agent, or Firm* — Mori & Ward, LLP (57) ABSTRACT

A hand for parallel link robot includes: a holder configured to extract a workpiece from an extraction portion and hold the workpiece; and a swing-up mechanism portion configured to swing the workpiece held by the holder up centering around a turning axis to change a posture of the workpiece. A parallel link robot includes: a link mechanism portion; and the hand mounted to the link mechanism portion.

22 Claims, 5 Drawing Sheets

(56) References Cited

U.S. PATENT DOCUMENTS

2013/0127192 A1* 5/2013 Regan .................. B25J 15/0675
                                                      294/185
2013/0190925 A1* 7/2013 Miyoshi .................. B25J 15/00
                                                      700/245

FOREIGN PATENT DOCUMENTS

| CN | 203380886 U   | 1/2014  |
|----|---------------|---------|
| EP | 2796393       | 10/2014 |
| IT | TO20120931    | 1/2013  |
| JP | 2970732 B2    | 6/1995  |
| JP | 2010-184328   | 8/2010  |
| JP | 2014-223718   | 12/2014 |
| WO | WO 2014/064593 | 5/2014 |

OTHER PUBLICATIONS

Extended European Search Report for corresponding EP Application No. 15150733.2-1707, Jun. 10, 2015.
Chinese Office Action for corresponding CN Application No. 201410811042.3, Jun. 22, 2016.
Chinese Office Action for corresponding CN Application No. 201410811042.3, Jan. 20, 2016.

* cited by examiner

PARALLEL LINK ROBOT, HAND FOR PARALLEL LINK ROBOT, AND PARALLEL LINK ROBOT SYSTEM

CROSS-REFERENCE TO RELATED APPLICATION

This application claims priority from Japanese Patent Application No. 2014-011707 filed with the Japan Patent Office on Jan. 24, 2014, the entire content of which is hereby incorporated by reference.

BACKGROUND

1. Technical Field

Embodiments of this disclosure relate to a parallel link robot, a hand for parallel link robot, and a parallel link robot system.

2. Description of the Related Art

Conventionally, there is known a container-aligning apparatus that changes a posture of a workpiece (for example, see Japanese Patent No. 2970732). The container-aligning apparatus disclosed in Japanese Patent No. 2970732 includes a robot. The robot changes the posture of the workpiece. This robot holds the workpiece at a holding position. The robot also releases and drops the workpiece at a releasing position such that one end of the workpiece engages engaging members.

SUMMARY

A hand for parallel link robot includes: a holder configured to extract a workpiece from an extraction portion and hold the workpiece; and a swing-up mechanism portion configured to swing the workpiece held by the holder up centering around a turning axis to change a posture of the workpiece.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A hand for parallel link robot according to a first aspect includes a holder and a swing-up mechanism portion. The holder extracts a workpiece from an extraction portion and holds the workpiece. The swing-up mechanism portion swings the workpiece held by the holder up centering around a turning axis to change a posture of the workpiece.

The parallel link robot according to a second aspect includes a link mechanism portion and the hand according to the first aspect. The hand is mounted to a tip portion of the link mechanism portion.

The parallel link robot system according to a third aspect includes the parallel link robot according to the second aspect, an extraction portion, and a placement portion. The extraction portion extracts the workpiece. The workpiece is placed on the placement portion.

The following describes embodiments with reference to the accompanying drawings.

Figure 1:
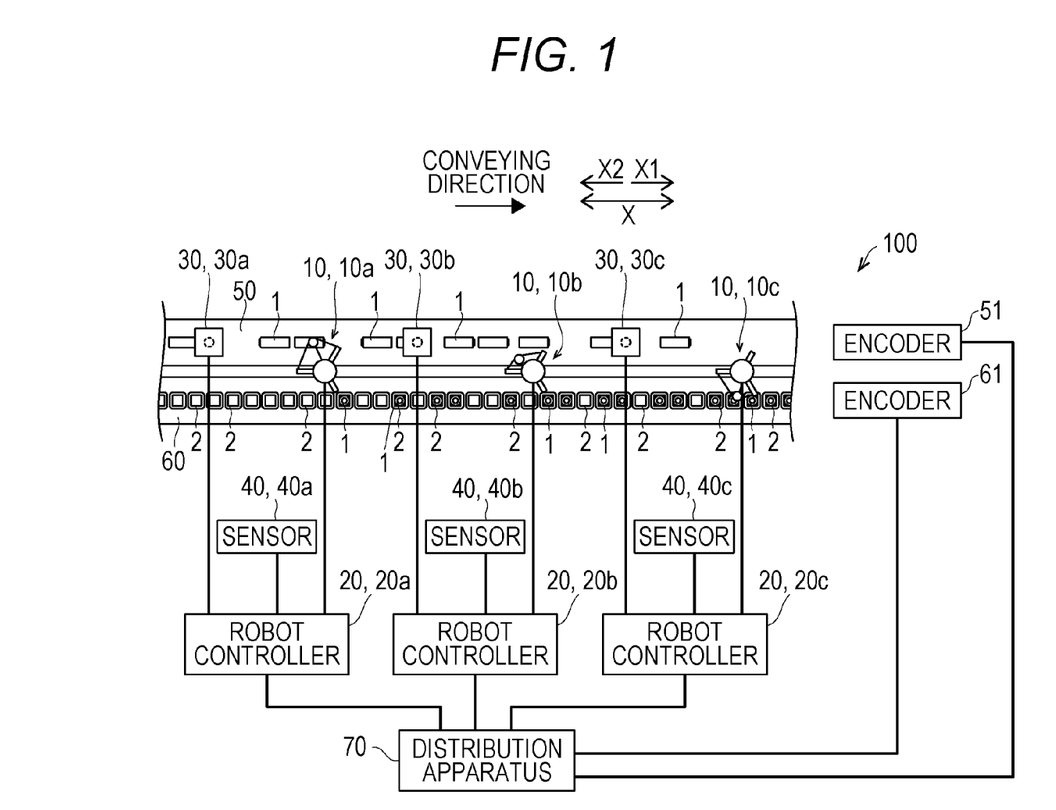
FIG. 1 is a plane view illustrating a schematic overall configuration of a parallel link robot system according to one embodiment.
Figure 2:
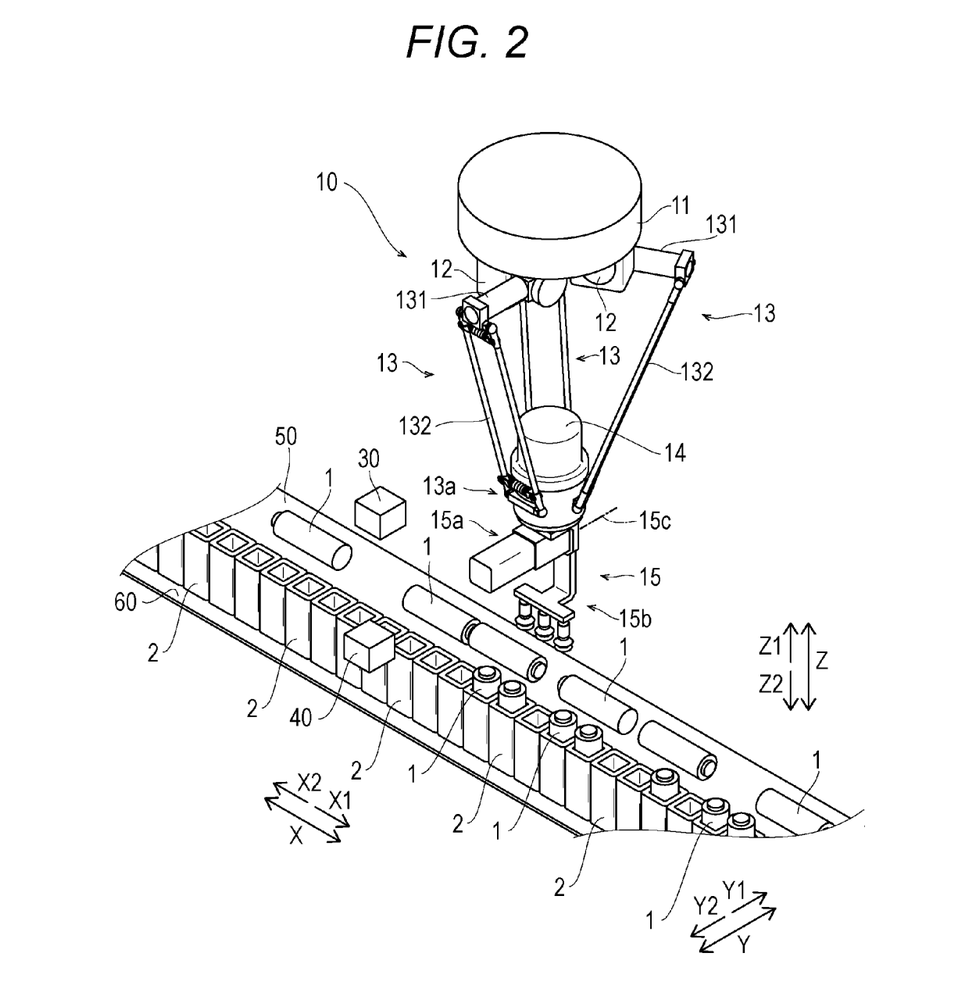
FIG. 2 is a perspective view illustrating a configuration of the parallel link robot system according to the one embodiment.

With reference to FIG. 1 and FIG. 2, the following describes a configuration of a parallel link robot system 100 according to this embodiment.

As illustrated in FIG. 1, the parallel link robot system 100 includes parallel link robots 10 (10a, 10b, and 10c), robot controllers 20 (20a, 20b, and 20c), imaging units 30 (30a, 30b, and 30c), sensors 40 (40a, 40b, and 40c), two conveyors (first conveyor 50 and second conveyor 60), and a distribution apparatus 70. The parallel link robot system 100 is configured to extract a workpiece 1 from the first conveyor 50, and insert the workpiece 1 into a box portion 2 on the second conveyor 60 to place the workpiece 1. The first conveyor 50 and the second conveyor 60 are one example of respective "extraction portion" and "placement portion."

The parallel link robots 10 are securely installed at a bottom surface of a ceiling upward of the first conveyor 50 and the second conveyor 60. The three parallel link robots 10 (10a, 10b, and 10c) are arranged in a conveying direction (X direction) of the conveyors (first conveyor 50 and the second conveyor 60). The parallel link robots 10a, 10b, and 10c are configured to extract the workpiece 1 that is fallen sideways (does not stand) conveyed by the first conveyor 50, change the posture of the workpiece 1 so as to be stood, and insert and place the workpieces 1 into the box portions 2 conveyed by the second conveyor 60. The parallel link robots 10 are arranged in the order from the parallel link robots 10a, 10b, and 10c from the upstream (X2 direction side) of the first conveyor 50 and the second conveyor 60 along the downstream (X1 direction side). In the parallel link robot system 100, the three parallel link robots 10a, 10b, and 10c is configured to insert the workpieces 1 into the all box portions 2 conveyed by the second conveyor 60.

The three parallel link robots 10 (10a, 10b, and 10c) each include the robot controllers 20 (20a, 20b, and 20c), the imaging units 30 (30a, 30b, and 30c), and the sensors 40 (40a, 40b, and 40c). The robot controllers 20a, 20b, and 20c each control the parallel link robots 10a, 10b, and 10c. The robot controllers 20a, 20b, and 20c are coupled to one another via the distribution apparatus 70. To the robot controllers 20a, 20b, and 20c, an encoder 51 of the first conveyor 50 and an encoder 61 of the second conveyor 60 are coupled via the distribution apparatus 70.

The robot controllers 20 (20a, 20b, and 20c) is each configured to control operations of the parallel link robots 10

(10*a*, 10*b*, and 10*c*). Specifically, the robot controllers 20 (20*a*, 20*b*, and 20*c*) are coupled to the parallel link robots 10 (10*a*, 10*b*, and 10*c*). The robot controller 20*a* (20*b* and 20*c*) is configured to control the parallel link robots 10 (10*a*, 10*b*, and 10*c*) based on the position and the posture of the workpiece 1 on the first conveyor 50 whose images have been captured by the imaging unit 30*a* (30*b* and 30*c*), a sensing result whether the workpieces 1 are placed at the respective box portions 2 or not by the sensor 40*a* (40*b* and 40*c*), a detection result of the encoder 51 of the first conveyor 50, and a detection result of the encoder 61 of the second conveyor 60, so as to extract the workpiece 1 from the first conveyor 50 to insert the workpieces 1 into the vacant box portions 2 on the second conveyor 60 and place the workpieces 1.

That is, the robot controller 20*a* (20*b* and 20*c*) is configured to control the parallel link robot 10*a* (10*b* and 10*c*) so as to suck a predetermined position of the workpiece 1, based on the position and the posture of the workpiece 1 on the first conveyor 50 which are captured by the imaging unit 30*a* (30*b* and 30*c*). The robot controller 20*a* (20*b* and 20*c*) calculates the position and the speed of the workpiece 1 conveyed by the first conveyor 50, in the conveying direction (X direction), based on the detection result of the encoder 51 of the first conveyor 50. Furthermore, the robot controller 20*a* (20*b* and 20*c*) is configured to control the parallel link robot 10*a* (10*b* and 10*c*) so as to extract the workpiece 1 from the first conveyor 50.

The robot controller 20*a* (20*b* and 20*c*) is configured to obtain information on the vacant (the workpiece 1 is not placed) box portion 2, based on the detection result whether the workpieces 1 are placed on the respective box portions 2 or not by the sensor 40*a* (40*b* and 40*c*). The robot controller 20*a* (20*b* and 20*c*) is configured to calculate the position and the speed of the box portions 2 conveyed by the second conveyor 60, based on the detection result by the encoder 61 of the second conveyor 60. Furthermore, the robot controller 20*a* (20*b* and 20*c*) is configured to control the parallel link robot 10*a* (10*b* and 10*c*) so as to insert the workpieces 1 into the box portions 2 on the second conveyor 60.

The imaging units 30 (30*a*, 30*b*, and 30*c*) is configured to capture an image of the workpiece 1 on the first conveyor 50. The imaging units 30 (30*a*, 30*b*, and 30*c*) are coupled to the robot controllers 20 (20*a*, 20*b*, and 20*c*). The imaging units 30 (30*a*, 30*b*, and 30*c*) capture the image whenever the parallel link robots 10 (10*a*, 10*b*, and 10*c*) extract the workpiece 1. Accordingly, even if another workpiece 1 on the first conveyor 50 is displaced when the parallel link robot 10 at the upstream extracts the workpiece 1, the imaging unit 30 at the downstream captures the image afterward. In view of this, the parallel link robot 10 at the downstream can also accurately extract the workpiece 1.

The sensors 40 (40*a*, 40*b*, and 40*c*) is configured to detect whether the workpieces 1 are inserted into (placed at) the respective box portions 2 on the second conveyor 60 or not. The sensors 40 (40*a*, 40*b*, and 40*c*) are coupled to the robot controllers 20 (20*a*, 20*b*, and 20*c*).

The first conveyor 50, as illustrated in FIG. 1 and FIG. 2, is configured to convey the workpieces 1 in the X direction. Specifically, the first conveyor 50 is configured to convey the workpieces 1 from the X2 direction to the X1 direction. The first conveyor 50 is configured to convey the workpieces 1 that are fallen sideways (do not stand). The encoder 51 of the first conveyor 50 is configured to detect the conveyance speed of the first conveyor 50.

The second conveyor 60, as illustrated in FIG. 1 and FIG. 2, is configured to convey the box portions 2 in the X direction. Specifically, the second conveyor 60 is configured to convey the box portions 2 from the X2 direction to the X1 direction. The second conveyor 60 is, as illustrated in FIG. 2, arranged adjacent to the first conveyor 50 on the Y2 direction side. The second conveyor 60 is configured to convey the stood workpieces 1 inserted into (placed at) the box portions 2. The encoder 61 of the second conveyor 60 is configured to detect the conveyance speed of the second conveyor 60. The second conveyor 60 is configured to be driven at a conveyance speed slower than the first conveyor 50. That is, the conveyance speeds of the first conveyor 50 and the second conveyor 60 are controlled such that the number of the workpieces 1 conveyed by the first conveyor 50 becomes approximately the same or larger than the number of the box portions 2 conveyed by the second conveyor 60.

The distribution apparatus 70 is configured to distribute signals inputted from the encoders 51 and 61, and output the signals to the robot controllers 20*a*, 20*b*, and 20*c*.

The following describes the configuration of the parallel link robot 10 according to the embodiment with reference to FIG. 2 to FIG. 8.

As illustrated in FIG. 2, the parallel link robot 10 includes a base portion 11, three servo motors 12, three link mechanism portions 13, a head portion 14, and a hand portion 15. The servo motors 12 are disposed within the base portion 11. The link mechanism portions 13 are coupled in parallel. The three servo motors 12 drive the respective three link mechanism portions 13. The head portion 14 is mounted to tip portions 13*a* of the three link mechanism portions 13. The hand portion 15 is mounted to the head portion 14. The servo motor 12 is one example of a "driving source." The hand portion 15 is one example of a "hand for parallel link robot." The parallel link robots 10*a*, 10*b*, and 10*c* mutually have a similar configuration. The following describes these parallel link robots 10*a*, 10*b*, and 10*c* as the parallel link robot 10.

The base portion 11 is configured to be installed at the bottom surface of the ceiling (surface on the Z2 direction side). The three servo motors 12, which are disposed within the base portion 11, are arranged so as to have approximately equiangular intervals (120-degree intervals) from one another with respect to the center of the base portion 11 in the plane view (viewed from the Z1 direction side). The three link mechanism portions 13 also, similar to the three servo motors 12, are arranged so as to have approximately equiangular intervals (120-degree intervals) from one another with respect to the center of the base portion 11 in the plane view.

As illustrated in FIG. 2, the three link mechanism portions 13 are coupled to one another at the tip portion 13*a* side. Here, the three link mechanism portions 13 mutually have a similar configuration. Specifically, the three link mechanism portions 13 each have a first arm (upper side arm) 131 and a second arm (lower side arm) 132. The first arm 131 is coupled to the servo motor 12. The second arm 132 is coupled to the first arm 131.

The one end of the first arm 131 is mounted to an output shaft of the servo motor 12. This servo motor 12 is configured to turn (swing) the first arm 131 vertically (Z direction) in a vertical plane (surface along the Z direction). The second arm 132 is mainly constituted of a pair of poles arranged parallel to one another. The one end of the second arm 132 is coupled to the other end of the first arm 131 (end opposite side from the servo motor 12). The other end of the second arm 132 (end at the opposite side from the first arm 131) is coupled to the head portion 14.

The link mechanism portion 13 is configured to move the head portion 14 and the hand portion 15 in the Z direction. That is, the link mechanism portion 13 is configured to adjust the position of the hand portion 15 in the Z direction (vertical direction).

The head portion 14 includes a servo motor. The head portion 14 is configured to cause the hand portion 15 to turn centering around the axis in the vertical direction (Z direction). That is, the head portion 14 is configured to adjust the orientation of the hand portion 15 in the X-Y surface (horizontal surface).

Here, in this embodiment, the hand portion 15 is mounted to the tip portions 13a of the three link mechanism portions 13 via the head portion 14. The hand portion 15 is, as illustrated in FIG. 2, includes a swing-up mechanism portion 15a and a holder 15b. The swing-up mechanism portion 15a is configured to swing the holder 15b holding the workpiece 1 up, centering around a turning axis 15c (axis along the X-Y plane) extending in the horizontal direction. The hand portion 15 is configured to extract the not standing elongated workpiece 1 from the first conveyor 50, and hold the workpiece 1 by the holder 15b. Furthermore, the hand portion 15 is configured to swing the held workpiece 1 up centering around the turning axis 15c in the horizontal direction by the swing-up mechanism portion 15a, resulting in standing the elongated workpiece 1. Furthermore, the hand portion 15 places the stood workpiece 1 on the second conveyor 60. Specifically, the hand portion 15 is configured to swing the held workpiece 1 up centering around the turning axis 15c in the horizontal direction by the swing-up mechanism portion 15a to change the posture of the workpiece 1, and then insert the workpiece 1 into the box portion 2.

Figure 3:
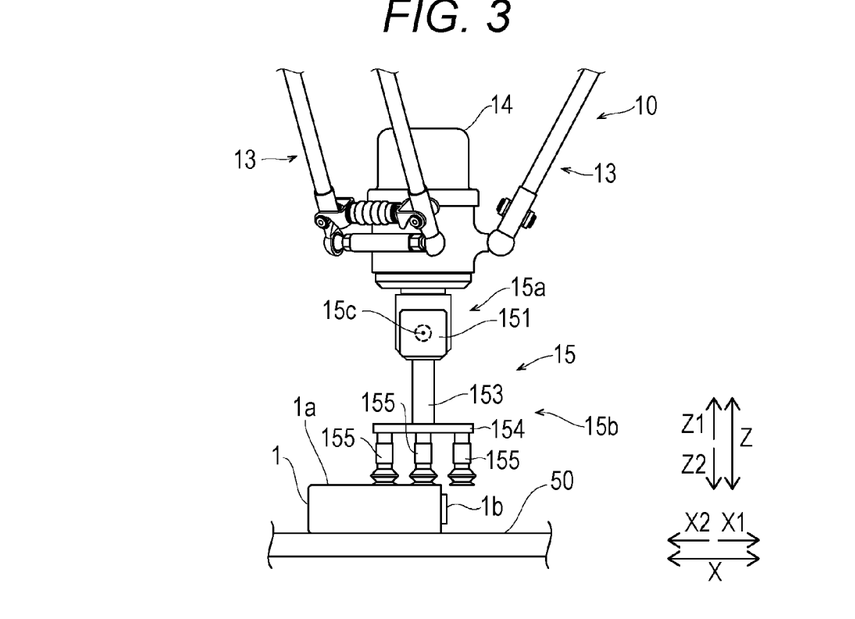
FIG. 3 is a front view for describing an extraction operation of the workpiece by the parallel link robot according to the one embodiment.
Figure 7:
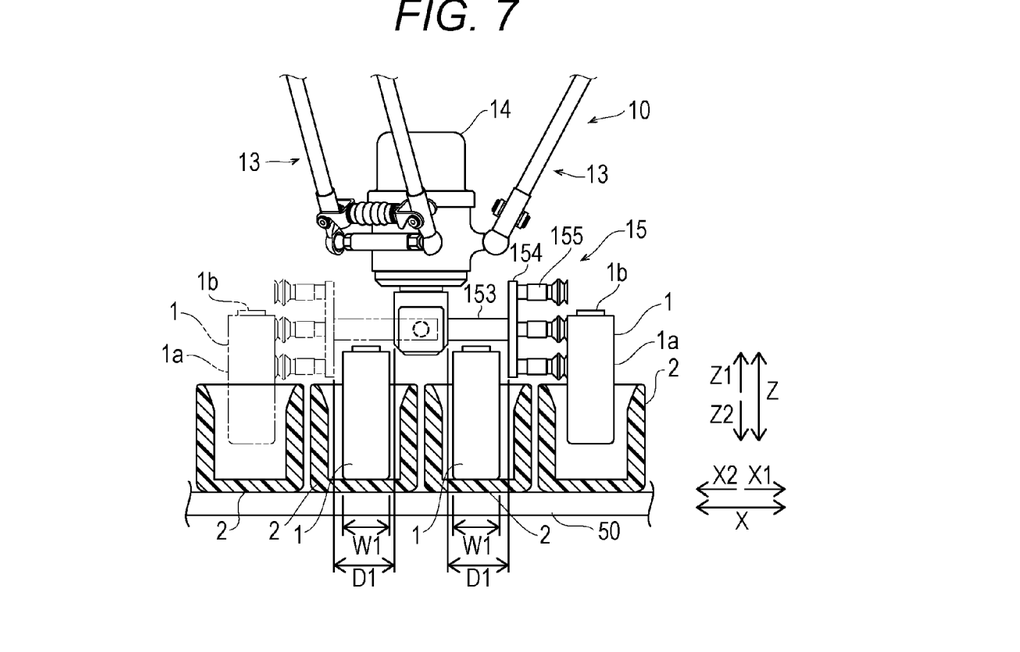
FIG. 7 is a front view for describing a placing operation of the workpiece by the parallel link robot according to the one embodiment.

Here, the workpiece 1, as illustrated in FIG. 3, includes a main body portion 1a and a convex portion 1b. As illustrated in FIG. 7, the workpiece 1 is inserted into the box portion 2 while the convex portion 1b faces upward (Z1 direction). The box portion 2 is, as illustrated in FIG. 2, has an opening on its top (Z1 direction). The plurality of box portions 2 are adjacent to one another in the X direction and are conveyed by the second conveyor 60. The internal side surfaces of the box portion 2, as illustrated in FIG. 4, has a tapered shape where the opening widens toward the top.

Figure 4:
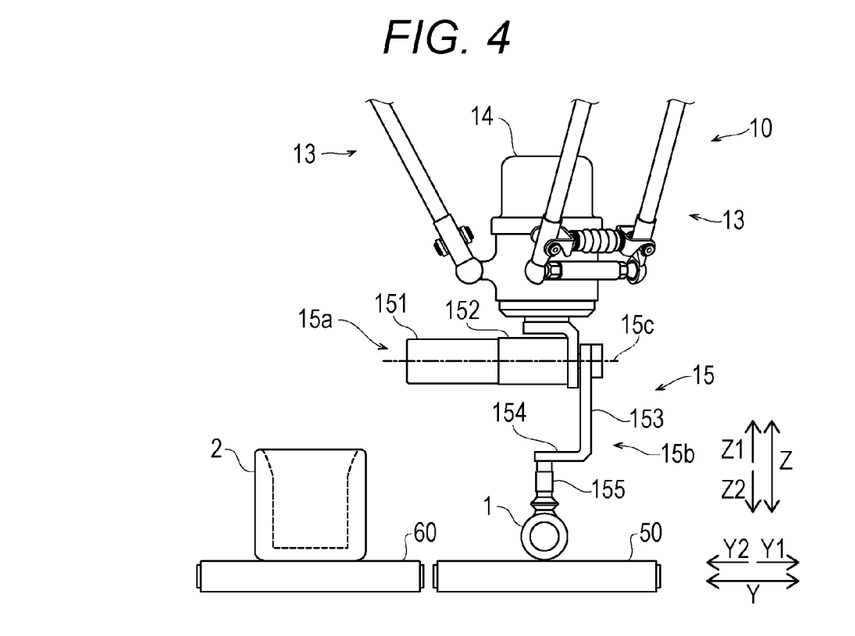
FIG. 4 is a side view for describing the extraction operation of the workpiece by the parallel link robot according to the one embodiment.

The swing-up mechanism portion 15a, as illustrated in FIG. 4, has a servo motor 151 and a reducer 152. The holder 15b has the arm portions 153 and 154 and a suction portion 155. The servo motor 151 is provided with an absolute value encoder (not illustrated). The absolute value encoder detects a turning position.

In this embodiment, the servo motor 151 is configured to swing the holder 15b up via the reducer 152 centering around the turning axis 15c in the horizontal direction. Specifically, by controlling the robot controller 20, the servo motor 151 is configured to change the turning direction according to the orientation of the workpiece 1 held by the holder 15b to set the workpiece 1 at a predetermined posture. The servo motor 151 is configured to swing the workpiece 1 held so as to be at the predetermined posture up centering around the turning axis 15c in the horizontal direction.

Figure 5:
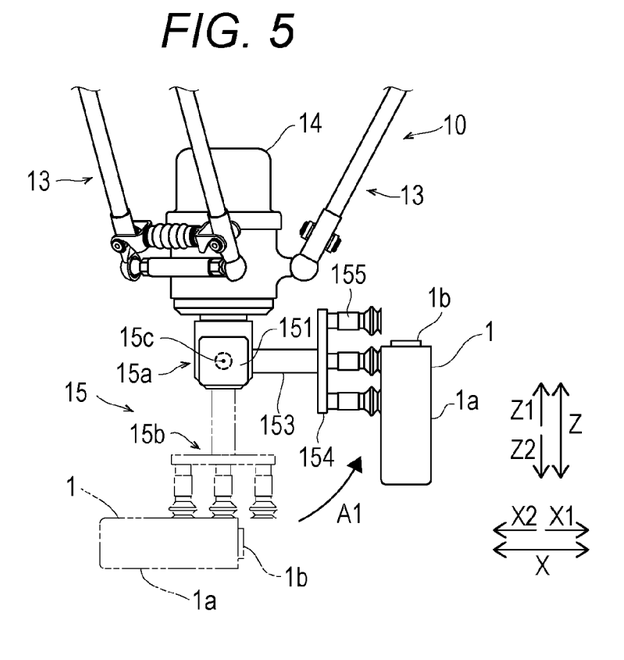
FIG. 5 is a front view in the case where a hand portion of the parallel link robot according to the one embodiment is swung up forward.
Figure 6:
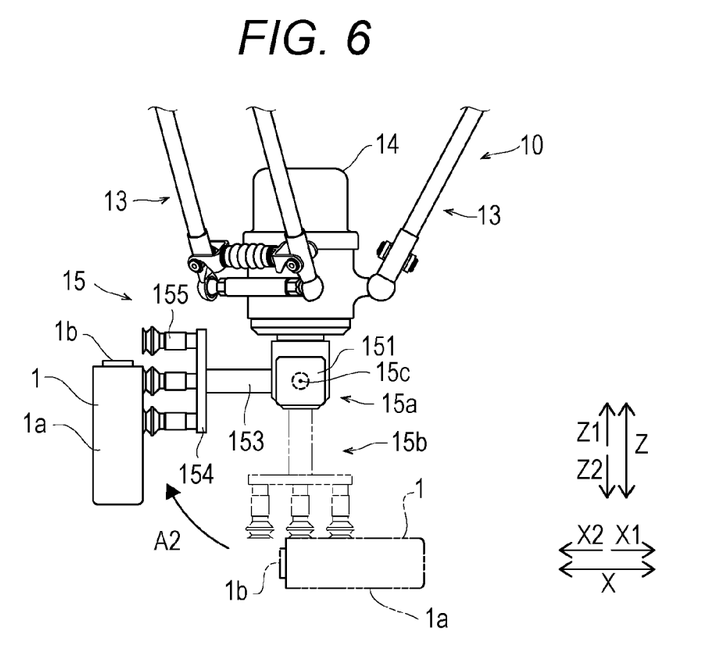
FIG. 6 is a front view in the case where the hand portion of the parallel link robot according to the one embodiment is swung up rearward.

That is, the hand portion 15 is configured to change a swing-up direction by the swing-up mechanism portion 15a such that the workpiece 1 is at the predetermined posture according to the orientation of the workpiece 1 detected by the imaging unit 30, and configured to swing the workpiece 1 up centering around the turning axis 15c in the horizontal direction. Specifically, as illustrated in FIG. 5, assume the case where the workpiece 1 is extracted from the first conveyor 50 at the posture of the convex portion 1b facing the forward side of the conveying direction (X1 direction side). In this case, the servo motor 151 swings the workpiece 1 (holder 15b) up toward the forward conveying direction (causes the workpiece 1 to turn in the A1 direction). As illustrated in FIG. 6, assume the case where the workpiece 1 is extracted from the first conveyor 50 at the posture of the convex portion 1b facing the backward side of the conveying direction (X2 direction side). In this case, the servo motor 151 swings the workpiece 1 (holder 15b) up toward the backward conveying direction (causes the workpiece 1 to turn in the A2 direction). That is, the workpiece 1 is swung up such that the convex portion 1b faces upward (Z1 direction). Accordingly, the above-described predetermined posture of the workpiece 1 is the posture of the workpiece where the convex portion 1b faces upward.

To form the angle of the holder 15b so as to be an angle where the workpiece 1 is likely to be sucked, the servo motor 151 is configured to cause the holder 15b to turn centering around the turning axis 15c according to the shape of the workpiece 1 arranged on the first conveyor 50. Accordingly, even if the sucked surface of the workpiece 1 is inclined, the angle of the holder 15b can be adjusted to the inclination of the sucked surface. This allows the holder 15b to reliably suck the workpiece 1.

The arm portions 153 and 154 of the holder 15b are configured to be turned centering around the turning axis 15c in the horizontal direction by the swing-up mechanism portion 15a. Specifically, the arm portion 153 is coupled to the servo motor 151 of the swing-up mechanism portion 15a via the reducer 152, and is configured to be turned centering around the turning axis 15c. The arm portion 153 is formed so as to extend in the direction approximately perpendicular to the turning axis 15c. The arm portion 154 is coupled to the end of the arm portion 153 at the opposite side from the turning axis 15c. The arm portion 154 is formed so as to extend in the direction approximately perpendicular to both the turning axis 15c and the arm portion 153. The three suction portions 155 are mounted to the arm portion 154 in the extending direction of the arm portion 154.

The suction portion 155 is configured to suck the workpiece 1 by negative pressure. The negative pressure is configured to be supplied to the three suction portions 155 independently. As illustrated in FIG. 3, the two suction portions 155 among the three suction portions 155 are configured to suck the workpiece 1. Specifically, the center suction portion 155 and the suction portion 155 positioned at the opposite side of the convex portion 1b of the workpiece 1 are configured to suck the side surface of the elongated workpiece 1. The two suction portions 155 suck the side surface of the elongated workpiece 1 closed to the convex portion 1b side.

As illustrated in FIG. 7, the holder 15b (hand portion 15) is formed to have a shape to avoid interference with the workpiece 1 placed on the second conveyor 60 when the holder 15b (hand portion 15) places the held workpiece 1 on the second conveyor 60, while overlapping the workpiece 1 already placed on the second conveyor 60. That is, the arm portion 153 of the holder 15b is formed such that a length D1 of the arm portion 153 becomes longer than a width W1 of the workpiece 1. This suppresses the arm portion 154 of the holder 15b to interfere with the already placed workpiece 1.

The following describes the extraction operation and the placing operation of the workpiece 1 by the parallel link robot 10 according to the embodiment with reference to FIG. 2 to FIG. 8.

First, as illustrated in FIG. 2, the imaging unit 30 captures images of the position and the posture of the workpiece 1 on the first conveyor 50. The sensor 40 detects whether the workpiece 1 is placed at (inserted into) the box portion 2 on the second conveyor 60 or not. Next, as illustrated in FIG. 3 and FIG. 4, based on the position and the posture of the workpiece 1 on the first conveyor 50 which have been captured by the imaging unit 30, the holder 15b of the hand portion 15 sucks and extracts the workpiece 1. In this respect, the head portion 14 adjusts the orientation of the hand portion 15 in the X-Y surface such that the orientation of the holder 15b of the hand portion 15 becomes approximately parallel to the workpiece 1. Furthermore, the link mechanism portion 13 adjusts the position of the hand portion 15 in the Z direction such that the holder 15b of the hand portion 15 can suck the workpiece 1.

Figure 8:
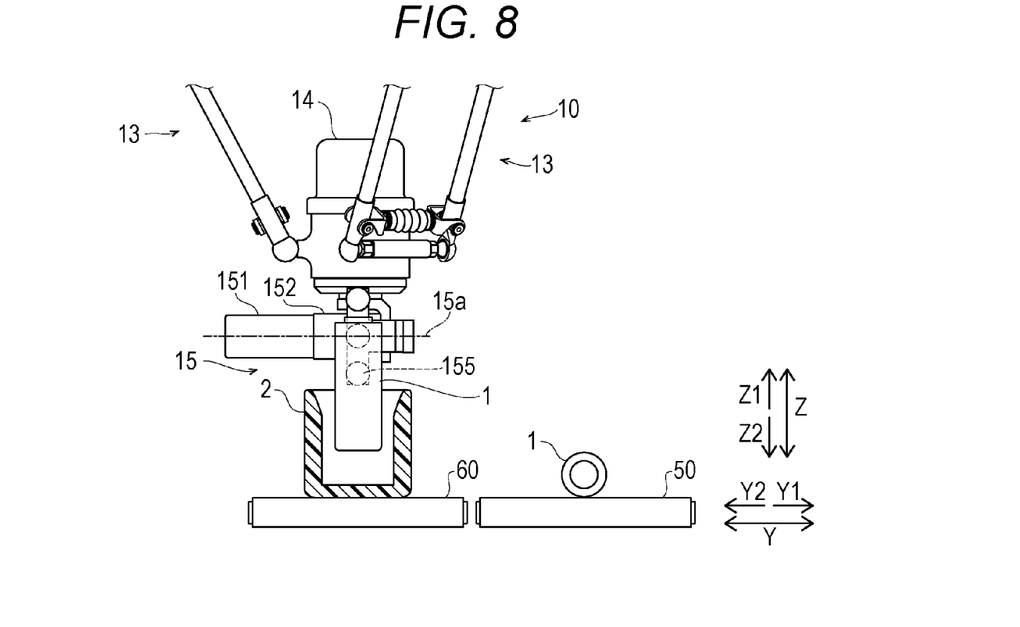
FIG. 8 is a side view for describing the placing operation of the workpiece by the parallel link robot according to the one embodiment.

As illustrated in FIG. 5 or FIG. 6, the swing-up mechanism portion 15a swings the workpiece 1 up centering around the turning axis 15c in the horizontal direction such that the convex portion 1b of the workpiece 1 has the posture of facing upward (Z1 direction). This swing-up direction changes according to the orientation of the workpiece 1 held by the holder 15b. Then, the head portion 14 adjusts the orientation of the hand portion 15 in the X-Y surface such that the workpiece 1 held by the holder 15b comes to approximately immediately above the opening of the box portion 2. As illustrated in FIG. 7 and FIG. 8, the link mechanism portion 13 moves the hand portion 15 in a Z2 direction. Afterwards, the holder 15b of the hand portion 15 releases the workpiece 1. Thus, the workpiece 1 whose convex portion 1b has a posture of facing upward is inserted into and placed at the vacant (the workpiece 1 has not yet been placed) box portion 2.

This embodiment can obtain the following effects.

In this embodiment, as described above, the hand portion 15 is provided with the holder 15b and the swing-up mechanism portion 15a. The holder 15b extracts the workpiece 1 from the first conveyor 50 and holds the workpiece 1. The swing-up mechanism portion 15a swings the workpiece 1 held by the holder 15b up centering around the turning axis 15c in the horizontal direction, to change the posture of the workpiece 1. This allows the hand portion 15 to change the posture of the workpiece 1 by the swing-up mechanism portion 15a while holding the workpiece 1 by the holder 15b. In view of this, the hand portion 15 can change the posture of the workpiece 1 without the workpiece 1 colliding with the engaging member or a similar member. This allows the hand portion 15 to change the posture of the workpiece 1 while suppressing the damage to the workpiece 1.

In this embodiment, as described above, the hand portion 15 is configured to extract and hold the not standing elongated workpiece 1 from the first conveyor 50 by the holder 15b. Furthermore, the hand portion 15 is configured to swing the held workpiece 1 up by the swing-up mechanism portion 15a centering around the turning axis 15c in the horizontal direction, resulting in standing the elongated workpiece 1. Furthermore, the hand portion 15 is configured to place the stood workpiece 1 on the second conveyor 60. Accordingly, the hand portion 15 can change the posture of the workpiece 1 to the standing posture and place the workpiece 1 on the second conveyor 60 while suppressing the damage to the elongated workpiece 1 that is fallen sideways (does not stand).

In this embodiment, as described above, the hand portion 15 is configured to swing the held workpiece 1 up centering around the turning axis 15c in the horizontal direction by the swing-up mechanism portion 15a to change the posture of the workpiece 1, and then insert the workpiece 1 into the box portion 2. Accordingly, even if the swing-up mechanism portion 15a sets the workpiece 1 at an unstable posture (the standing posture of the workpiece in the case where the workpiece is less likely to stand alone), insertion of the workpiece 1 into the box portion 2 allows maintaining the posture of the workpiece 1.

In this embodiment, as described above, the servo motor 151 of the swing-up mechanism portion 15a is configured to change the turning direction according to the orientation of the workpiece 1 held by the holder 15b to set the workpiece 1 at the predetermined posture. Furthermore, the servo motor 151 swings the workpiece 1 held so as to be at the predetermined posture up centering around the turning axis 15c in the horizontal direction. This allows the posture of the workpiece 1 to be easily aligned at the predetermined posture and the workpiece 1 to be placed at the box portion 2 on the second conveyor 60.

In this embodiment, as described above, the servo motor 151 of the swing-up mechanism portion 15a is configured to swing the holder 15b up centering around the turning axis 15c in the horizontal direction via the reducer 152. Accordingly, even if an output from the servo motor 151 is small, the heavy workpiece 1 can be swung up by an increase in a torque according to a reduction gear ratio of the reducer 152. If electric power supplied to the parallel link robot system 100 is stopped due to, for example, a power failure, the reducer 152 can maintain the swing-up posture of the holder 15b.

In this embodiment, as described above, the holder 15b is provided with the arm portions 153 and 154 and the suction portions 155. The swing-up mechanism portion 15a turns the arm portions 153 and 154 centering around the turning axis 15c in the horizontal direction. The suction portions 155 are mounted to the arm portion 154 and suck the workpiece 1. Accordingly, the hand portion 15 can easily move (turn) the suction portions 155 with the workpiece 1 sucked, by the swing-up mechanism portion 15a via the a portions 153 and 154.

In this embodiment, as described above, the hand portion 15 extracts and holds the workpiece 1, which is conveyed by the first conveyor 50, by the holder 15b. Furthermore, the hand portion 15 is configured to swing the held workpiece 1 up centering around the turning axis 15c in the horizontal direction by the swing-up mechanism portion 15a to change the posture of the workpiece 1. Furthermore, the hand portion 15 is configured to place the workpiece 1 whose posture has been changed on the second conveyor 60. Accordingly, the hand portion 15 can easily move and convey the workpiece 1 conveyed by the first conveyor 50, on the second conveyor 60 after changing the posture of the workpiece 1.

In this embodiment, as described above, the hand portion 15 is formed to have a shape to avoid interference with the workpiece 1 placed on the second conveyor 60 when the hand portion 15 places the held workpiece 1 on the second conveyor 60, while overlapping the workpiece 1 already placed on the second conveyor 60 in the plane view (viewed from the Z direction). Accordingly, even if the workpiece 1 has already been placed at the position adjacent to the position where the workpiece 1 is to be placed on the second conveyor 60, the hand portion 15 does not interfere with the already-placed workpiece 1 and can easily place the new workpiece 1.

Therefore, the above-disclosed embodiments are all considered as illustrative and not restrictive. The scope of the disclosure is indicated by the appended claims rather than by the foregoing description of the embodiment. All variations falling within the equivalency range of the appended claims are intended to be embraced therein.

For example, the embodiment describes the example of using the parallel link robot including the three link mechanism portions. Instead of this, the parallel link robot including the two link mechanism portions may be used. Alternatively, the parallel link robot including the four or more link mechanism portions may be used.

The embodiment describes the example of extracting the workpiece arranged on the first conveyor. Instead of this, the workpiece may be extracted from, for example, a container such as a box or a tray where the workpiece is arranged.

The embodiment describes the example where the workpiece extracted from the first conveyor is inserted into (placed at) the box portion arranged on the second conveyor. Instead of this, the workpiece extracted from the first conveyor may be directly arranged on the second conveyor. Alternatively, the extracted workpiece may be placed on the placement portion other than a conveyor.

In the embodiment, the hand portion is configured to extract the elongated workpiece that is fallen sideways, change the posture of the workpiece to the standing posture, and place the workpiece at the box portion on the conveyor. Instead of this, the hand portion may extract the stood workpiece, change the posture of the workpiece to the posture of being fallen sideways, and place the workpiece on a conveyor or at the box portion on the conveyor. Alternatively, the hand portion may extract the workpiece at the posture other than the stood state, change the posture of the workpiece to another posture, and place the workpiece on the conveyor or at the box portion on the conveyor.

The above-described embodiment describes the example of extracting the elongated workpiece. However, the workpiece may not be the elongated shape.

The above-described embodiment describes the example of the configuration of sucking the workpiece by the suction portions at the holder. However, the holder may not hold the workpiece by adsorption. For example, the holder may hold the workpiece by magnetic force. Alternatively, the holder may hold the workpiece by gripping the workpiece with, for example, a grip portion.

The embodiment describes the example of the following configuration. The swing-up mechanism portion includes the servo motor. The servo motor swings the workpiece up centering around the turning axis in the horizontal direction. Instead of this, the swing-up mechanism portion may include a driving mechanism other than the servo motor. For example, the swing-up mechanism portion may include the driving mechanism such as an air cylinder or a stepping motor.

In the embodiment, the swing-up mechanism portion 15a is configured to swing the holder 15b holding the workpiece 1 up centering around the turning axis 15c (axis along the X-Y plane) extending in the horizontal direction. However, as long as the swing-up mechanism portion 15a can set the posture of the workpiece 1 at the predetermined posture, the extending direction of the turning axis 15c may be displaced from the horizontal direction.

The embodiment of this disclosure may also be the following parallel link robot, the hand for parallel link robot, and the parallel link robot system.

A first parallel link robot includes a plurality of link mechanism portions and a hand portion. The plurality of link mechanism portions are coupled in parallel and are driven by a plurality of respective driving sources. The hand portion is mounted to a tip portion of the plurality of link mechanism portions. The hand portion includes a holder and a swing-up mechanism portion. The holder extracts an extraction portion from the workpiece and holds the workpiece. The swing-up mechanism portions swings the workpiece held by the holder centering around a turning axis in a horizontal direction to change the posture of the workpiece.

A second parallel link robot according to the first parallel link robot is configured as follows. The hand portion extracts the not standing elongated workpiece from the extraction portion and holds the elongated workpiece by the holder. Additionally, the hand portion swings the held workpiece up centering around the turning axis in the horizontal direction by the swing-up mechanism portion to stand the elongated workpiece, and places the workpiece on the placement portion.

A third parallel link robot according to the first or the second parallel link robot is configured as follows. The hand portion swings the held workpiece centering around the turning axis in the horizontal direction by the swing-up mechanism portion to change the posture of the workpiece and inserts the workpiece into the box portion.

A fourth parallel link robot according to any one of the first to the third parallel link robots is configured as follows. The swing-up mechanism portion includes a servo motor. The servo motor changes a turning direction according to an orientation of the workpiece held by the holder and swings the workpiece held so as to be at a predetermined posture up centering around the turning axis in the horizontal direction.

A fifth parallel link robot according to the fourth parallel link robot is configured as follows. The swing-up mechanism portion further includes a reducer. The servo motor swings the holder up centering around the turning axis in the horizontal direction via the reducer.

A sixth parallel link robot according to any one of the first to the fifth parallel link robots is configured as follows. The holder includes an arm portion and a suction portion. The arm portion is turned by the swing-up mechanism portion centering around the turning axis in the horizontal direction. The suction portion is disposed at the arm portion and sucks the workpiece.

A seventh parallel link robot according to any one of the first to the sixth parallel link robots is configured as follows. The hand portion extracts the workpiece conveyed by an extraction portion including the first conveyor and holds the workpiece by the holder. The swing-up mechanism portion swings the held workpiece up centering around the turning axis in the horizontal direction to change a posture of the workpiece and places the workpiece on a placement portion including the second conveyor.

An eighth parallel link robot according to any one of the first to the seventh parallel link robots is configured as follows. When the hand portion places the held workpiece on the placement portion, the hand portion is formed to have a shape to avoid interference with the workpiece placed on the placement portion while overlapping the workpiece already placed on the placement portion.

A first hand for parallel link robot includes a holder and a swing-up mechanism portion. The holder extracts the workpiece from the extraction portion and holds the workpiece. The swing-up mechanism portion swings the workpiece held by the holder up centering around the turning axis in the horizontal direction to change the posture of the workpiece.

A first parallel link robot system includes a plurality of link mechanism portions, a parallel link robot, an extraction portion, and a placement portion. The plurality of link mechanism portions are coupled in parallel and are driven by a plurality of respective driving sources. The parallel link robot includes a hand portion mounted to a tip portion of the plurality of link mechanism portions. The workpiece is extracted from extraction portion. The workpiece is placed on the placement portion. The hand portion includes a holder and a swing-up mechanism portion. The holder extracts the workpiece from the extraction portion and holds the workpiece. The swing-up mechanism portion swings the workpiece held by the holder up centering around the turning axis in the horizontal direction to change the posture of the workpiece.

A second parallel link robot system according to the first parallel link robot system further includes an imaging unit configured to detect an orientation of the workpiece of the extraction portion. The hand portion is configured to change a swing-up direction by the swing-up mechanism portion such that the workpiece is at a predetermined posture according to an orientation of the workpiece detected by the imaging unit, and swing the workpiece up centering around the turning axis in the horizontal direction.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A hand for parallel link robot, comprising:
   a holder configured to extract a workpiece from an extraction portion and hold the workpiece; and
   a swing-up mechanism portion including a servo motor having a turning axis extending in a horizontal direction and configured to swing the workpiece held by the holder up centering around the turning axis to change a posture of the workpiece,
   wherein the holder includes:
      a first arm portion having a first end and a second end, the first arm portion longitudinally extending from the first end in a first direction, the first direction being orthogonal to the turning axis, the servo motor being connected to the first end of the first arm portion to rotate about the turning axis that extends through the first end of the first arm portion;
      a second arm portion directly connected to the second end of the first arm portion, the second arm portion linearly and longitudinally extending in a second direction orthogonal to the first direction and orthogonal to the turning axis; and
      at least three suction portions configured to suck the workpiece, the at least three suction portions being directly provided on the second arm portion, all suction portions of the at least three of suction portions being linearly aligned along the second arm portion in the second direction such that the servo motor is configured to rotate the holder about the turning axis from a first orientation in which the at least three suction portions are aligned in the horizontal direction to a second orientation in which the at least three suction portions are aligned in a vertical direction.

2. The hand according to claim 1, wherein the turning axis extends in a horizontal direction.

3. A parallel link robot, comprising:
   a link mechanism portion; and
   the hand according to claim 1, the hand being mounted to a tip portion of the link mechanism portion.

4. The parallel link robot according to claim 3, comprising a plurality of the link mechanism portions, wherein the plurality of link mechanism portions are coupled in parallel to one another, and driven by a plurality of respective driving sources.

5. The parallel link robot according to claim 3, wherein the holder is configured to extract the not standing elongated workpiece from the extraction portion and hold the elongated workpiece, and
   the swing-up mechanism portion is configured to swing the held workpiece up centering around the turning axis to stand the elongated workpiece, and place the workpiece on a placement portion.

6. The parallel link robot according to claim 3, wherein the swing-up mechanism portion is configured to swing the held workpiece up centering around the turning axis to change a posture of the workpiece, and insert the workpiece into a box portion.

7. The parallel link robot according to claim 3, wherein the servo motor is configured to change a turning direction according to an orientation of the workpiece held by the holder to set the workpiece at a predetermined posture, and swing the workpiece held so as to be at the predetermined posture up centering around the turning axis.

8. The parallel link robot according to claim 7, wherein the swing-up mechanism portion further includes a reducer, and
   the servo motor is configured to swing the holder up via the reducer centering around the turning axis.

9. The parallel link robot according to claim 3, wherein the holder is configured to extract the workpiece conveyed by an extraction portion including an first conveyor, and hold the workpiece, and
   the swing-up mechanism portion is configured to swing the held workpiece up centering around the turning axis to change a posture of the workpiece, and place the workpiece on a placement portion including a second conveyor.

10. The parallel link robot according to claim 3, wherein when the holder places the held workpiece on the placement portion, the holder is formed to have a shape to avoid interference with the workpiece placed on the placement portion while overlapping the workpiece already placed on the placement portion.

11. The parallel link robot according to claim 3, wherein the link mechanism portion is configured to adjust a position of the hand in a vertical direction.

12. The parallel link robot according to claim 3, further comprising
   a head portion configured to adjust an orientation of the hand in a horizontal plane.

13. The parallel link robot system, comprising:
the parallel link robot according to claim 3;
an extraction portion from which the workpiece is extracted; and
a placement portion where the workpiece is placed.

14. The parallel link robot system according to claim 13, further comprising
an imaging unit configured to detect an orientation of the workpiece on the extraction portion, wherein
the swing-up mechanism portion is configured to change a swing-up direction so as to set the workpiece at a predetermined posture according to an orientation of the workpiece detected by the imaging unit, and swing the workpiece up centering around the turning axis.

15. The hand according to claim 1, wherein
the plurality of suction portions are configured to independently suck the workpiece.

16. The hand according to claim 1, wherein
the plurality of suction portions includes a first suction portion and a second suction portion that are configured to simultaneously suck the workpiece during holding of the workpiece.

17. The hand according to claim 1, wherein
a center of the second arm is attached to the second end of the first arm portion.

18. The hand according to claim 17, wherein
a longitudinal length of the first arm portion is longer than a width of the workpiece.

19. A parallel link robot, comprising:
a link mechanism portion;
a hand comprising:
  a holder configured to extract a workpiece from an extraction portion and hold the workpiece; and
  a swing-up mechanism portion including a servo motor having a turning axis extending in a horizontal direction and configured to swing the workpiece held by the holder up centering around the turning axis to change a posture of the workpiece; and
a head portion connected to the link mechanism portion and configured to adjust an orientation of the hand in a horizontal plane, wherein
the servo motor being mounted to a plate extending from the head portion,
the holder includes:
  a first arm portion having a first end and a second end, the first arm portion longitudinally extending from the first end in a first direction, the first direction being orthogonal to the turning axis, the servo motor being connected to the first end of the first arm portion to rotate about the turning axis that extends through the first end of the first arm portion;
  a second arm portion directly connected to the second end of the first arm portion, the second arm portion linearly and longitudinally extending in a second direction orthogonal to the first direction and orthogonal to the turning axis; and
  at least three suction portions configured to suck the workpiece, the at least three suction portions being directly provided on the second arm portion, all suction portions of the at least three of suction portions being linearly aligned along the second arm portion in the second direction, and
the servo motor being configured to rotate the holder about the turning axis from a first orientation in which the at least three suction portions are aligned in the horizontal direction to a second orientation in which the at least three suction portions are aligned in a vertical direction.

20. The parallel link robot according to claim 19, wherein
the swing-up mechanism portion further includes a reducer mounted to the plate, and
the servo motor is configured to swing the holder up via the reducer centering around the turning axis.

21. The parallel link robot according to claim 19, wherein
a center of the second arm is attached to the second end of the first arm portion.

22. The parallel link robot according to claim 21, wherein
a longitudinal length of the first arm portion is longer than a width of the workpiece.

* * * * *